(12) United States Patent
Huang et al.

(10) Patent No.: US 8,997,606 B2
(45) Date of Patent: Apr. 7, 2015

(54) HOUSING ASSEMBLY

(71) Applicant: American Axle & Manufacturing, Inc., Detroit, MI (US)

(72) Inventors: Zugang Huang, Troy, MI (US); James P. Downs, South Lyon, MI (US); Gregory A. Marsh, Ferndale, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 151 days.

(21) Appl. No.: 13/793,344

(22) Filed: Mar. 11, 2013

(65) Prior Publication Data

US 2014/0251081 A1  Sep. 11, 2014

(51) Int. Cl.
| | | |
|---|---|---|
| B60B 35/16 | (2006.01) | |
| B60B 35/12 | (2006.01) | |
| B60B 35/14 | (2006.01) | |

(52) U.S. Cl.
CPC ........... B60B 35/163 (2013.01); *Y10T 74/2188* (2015.01); B60B 35/125 (2013.01); B60B 35/14 (2013.01)

(58) Field of Classification Search
CPC ...... B60B 35/125; B60B 35/14; B60B 35/163
USPC .............................. 74/607; 403/272; 180/380; 280/124.156, 124.175
See application file for complete search history.

(56) References Cited

U.S. PATENT DOCUMENTS

| | | | |
|---|---|---|---|
| 25,591 A | * | 9/1859 | Guy .............................. 239/569 |
| 1,083,767 A | | 1/1914 | Stewart |
| 2,674,783 A | | 4/1954 | Schneider |
| 3,015,238 A | | 1/1962 | Williams |
| 4,455,732 A | | 6/1984 | Shiets |
| 5,067,582 A | * | 11/1991 | Muller et al. ................. 180/380 |
| 5,163,226 A | | 11/1992 | Phelps |
| 5,848,853 A | * | 12/1998 | Clenet .......................... 403/272 |
| 6,024,418 A | | 2/2000 | Ebert |
| 6,257,090 B1 | * | 7/2001 | Arakawa et al. ................ 74/607 |
| 7,140,530 B2 | | 11/2006 | Durand et al. |
| 2008/0079308 A1 | | 4/2008 | Kretschmer |
| 2008/0227581 A1 | | 9/2008 | Catalano et al. |
| 2009/0255341 A1 | | 10/2009 | Zimmerman et al. |
| 2010/0243356 A1 | | 9/2010 | Platt et al. |
| 2012/0019053 A1 | | 1/2012 | Doud et al. |

FOREIGN PATENT DOCUMENTS

| | | | | |
|---|---|---|---|---|
| EP | 0277891 | * | 8/1988 | ............ B62K 19/20 |
| JP | 2008265459 A | | 11/2008 | |
| JP | 2009067163 A | | 4/2009 | |

* cited by examiner

*Primary Examiner* — Vinh Luong
(74) *Attorney, Agent, or Firm* — Harness, Dickey & Pierce, P.L.C.

(57) ABSTRACT

An assembly that includes a tube mount, a tube, a first fillet weld, and a second fillet weld. The tube mount has a tubular side wall, a plurality of circumferentially spaced apart notches formed on a first end of the tubular side wall, and a securing aperture formed through the tubular side wall. The notches form a plurality of teeth. The tube is received into the tube mount. The first fillet weld couples the tube to the tube mount. The first fillet weld is formed about a perimeter the first end such that each of the first welds is formed substantially completely over the entirety of the teeth. The second fillet weld couples the tube to the tube mount. The second fillet weld is formed about a perimeter of the securing aperture such that the second fillet weld is formed substantially completely over an inside perimeter of the securing aperture.

22 Claims, 4 Drawing Sheets

HOUSING ASSEMBLY

FIELD

The present disclosure relates to a housing assembly.

BACKGROUND

This section provides background information related to the present disclosure which is not necessarily prior art.

A conventional "banjo-style" axle housing assembly is disclosed in U.S. Pat. No. 2,674,783. The axle housing assembly includes a housing center section and a pair of tubular sleeves. The housing center section comprises two shell members that are butt welded together along their abutting edges. Each of the tubular sleeves is welded to a corresponding lateral end of the housing center section (e.g., via a fillet or ring weld).

While such axle housing assemblies are satisfactory for their intended purpose, axle assemblies and more generally, housing assemblies, are nonetheless susceptible to improvement.

SUMMARY

This section provides a general summary of the disclosure, and is not a comprehensive disclosure of its full scope or all of its features.

In one form, the present teachings provide an axle assembly that includes a carrier housing, a pair of axle tubes and a pair of first fillet welds. The carrier housing has a carrier portion, a pair of bearing bulkheads, and a pair of tube mounts. The carrier portion has a wall member and defines a differential cavity about the bearing bulkheads. The bearing bulkheads are fixedly coupled to the wall member and configured to support a differential assembly for rotation within the differential cavity. Each of the tube mounts is a hollow structure with a proximal end, which is fixedly coupled to an associated lateral side of the carrier portion, and a distal end that is opposite the proximal end. The tube mounts are in fluid communication with the differential cavity. Each of the distal ends of the tube mounts has a plurality of circumferentially spaced apart notches that define a plurality of teeth. Each of the axle tubes is received into an associated one of the tube mounts. The first fillet welds couple the axle tubes to the tube mounts. Each of the first fillet welds is formed about a perimeter an associated one of the distal ends such that each of the first welds occurs substantially completely over the entirety of the teeth.

In another form, the present teachings provide an axle assembly with a carrier housing, a pair of axle tubes and a pair of fillet welds. The carrier housing has a wall member, a pair of bearing bulkheads, and a pair of tube mounts. The wall member defines a differential cavity about the bearing bulkheads. The bearing bulkheads are fixedly coupled to the wall member and configured to support a differential assembly for rotation within the differential cavity. Each of the tube mounts is a hollow structure with a proximal end, which is fixedly coupled to an associated lateral side of the carrier housing, and a distal end that is opposite the proximal end. A securing aperture is formed through each of the tube mounts. Each of the axle tubes is received into an associated one of the tube mounts. Each of the fillet welds couples a corresponding one of the axle tubes to a corresponding one of the tube mounts. Each of the fillet welds is formed about a perimeter of an associated one of the securing apertures such that each of the fillet welds occurs substantially completely over an inside perimeter of the associated one of the securing apertures.

In still another form, the present teachings provide an assembly that includes a tube mount, a tube, a first fillet weld, and a second fillet weld. The tube mount has a tubular side wall, a plurality of circumferentially spaced apart notches formed on a first end of the tubular side wall, and a securing aperture formed through the tubular side wall. The notches form a plurality of teeth. The tube is received into the tube mount. The first fillet weld couples the tube to the tube mount. The first fillet weld is formed about a perimeter the first end such that each of the first welds is formed substantially completely over the entirety of the teeth. The second fillet weld couples the tube to the tube mount. The second fillet weld is formed about a perimeter of the securing aperture such that the second fillet weld is formed substantially completely over an inside perimeter of the securing aperture.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
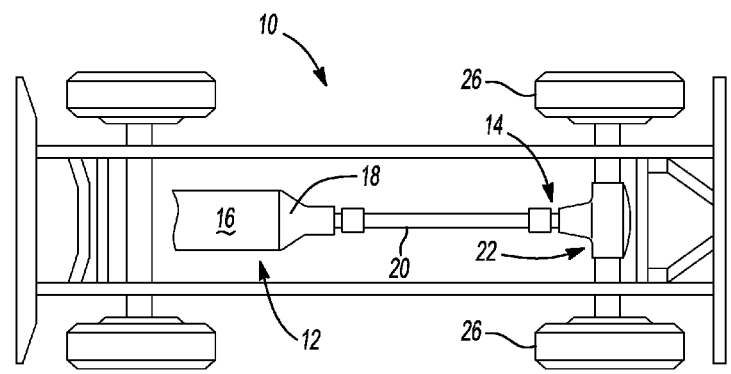
FIG. 1 is a schematic illustration of an exemplary vehicle having a rear axle assembly constructed in accordance with the teachings of the present disclosure.

With reference to FIG. 1 of the drawings, an exemplary vehicle having a housing assembly (e.g., an axle housing assembly) constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of a two-wheel, rear-wheel drive configuration, but those of skill in the art will appreciate that the teachings of the present disclosure are applicable to other drive train configurations, including four-wheel drive configurations, all-wheel drive configurations, and front-wheel drive configurations. The drive train 14 can include a prop shaft 20 and a rear axle assembly 22. The propshaft 20 can couple the transmission 18 to the rear axle assembly 22 such that rotary power output of the transmission 18 is received by the rear axle assembly 22. The rear axle assembly 22 can distribute the rotary power to the rear vehicle wheels 26.

Figure 2:
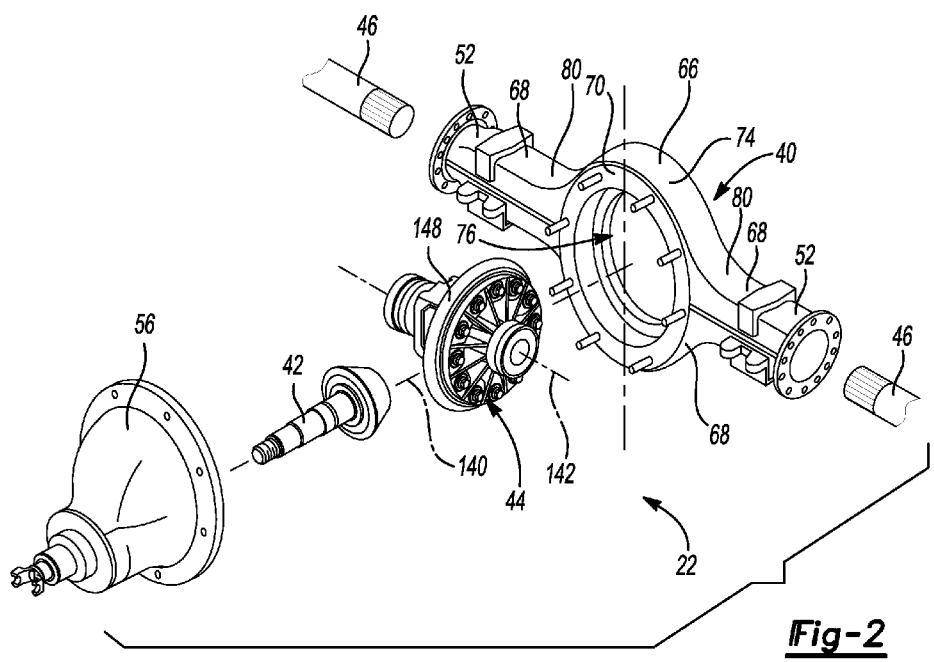
FIG. 2 is a front exploded perspective view of a portion of the vehicle of FIG. 1 illustrating a rear axle assembly in more detail.
Figure 3:
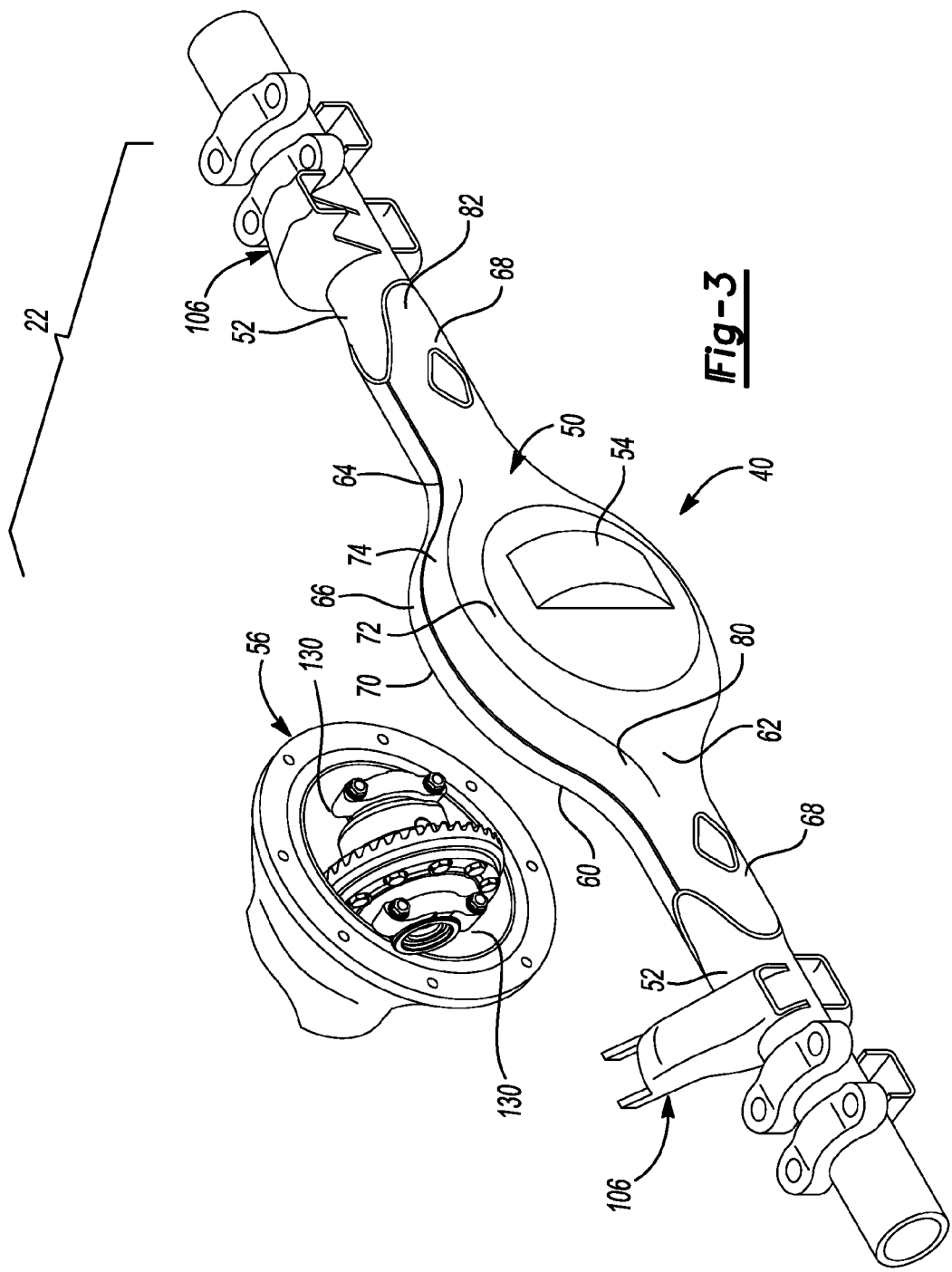
FIG. 3 is a rear exploded perspective view of the rear axle housing assembly.

With reference to FIGS. 2 and 3, the rear axle assembly 22 can include an axle housing assembly 40, an input pinion 42, a differential assembly 44, and a pair of axle shafts 46. The axle housing assembly 40 can include a carrier housing 50, a pair of axle tubes 52, a housing cover 54 and a carrier 56. The carrier housing 50 can have a first housing shell 60 and a second housing shell 62 that can be welded together via a pair of welds 64 to form a carrier portion 66 and a pair of tube mounts 68. The first and second housing shells 60 and 62 can be formed of any desired material, such as steel. In the particular example provided, the first and second housing shells 60 and 62 divide the carrier housing 50 in the fore-aft direction, but it will be appreciated that the first and second housing shells 60 and 62 could divide the center carrier housing 50 in the vertical direction in the alternative. The carrier portion 66 can have a front flange 70, a rear flange 72, and a wall member 74 that can cooperate with the front and rear flanges 70 and 72 to define a differential cavity 76.

Figure 4:
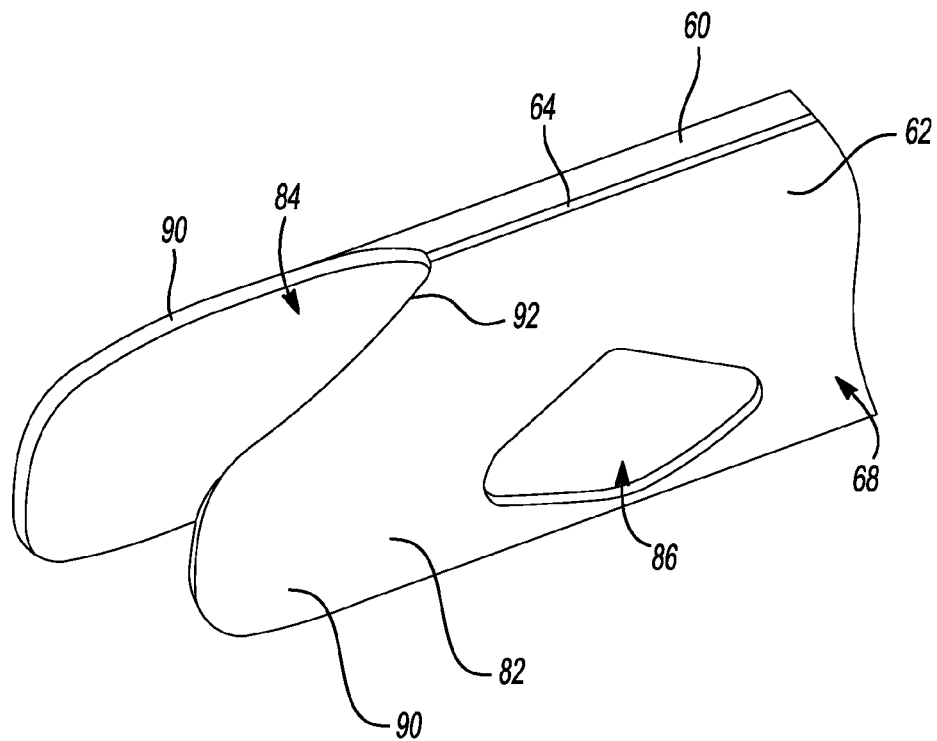
FIG. 4 is a perspective view of a portion of the rear axle assembly illustrating a tube mount in more detail.

Each of the tube mounts 68 can be a hollow structure with a proximal end 80, which can be fixedly coupled to an associated lateral side of the carrier portion 66, and a distal end 82 that is opposite the proximal end 80. The tube mounts 68 can be in fluid communication with the differential cavity 76. With reference to FIG. 4, each of the tube mounts 68 can have a plurality of circumferentially spaced apart notches 84 and/or can define one or more securing apertures 86. The notches 84 can be formed on the distal ends 82 of the tube mounts 68 and can be shaped and sized in any desired manner, such as of varying shapes and/or sizes, or of identical shape and size (as in the example provided). The notches 84 can form a plurality of teeth 90 wherein each tooth 90 can have a root 92 and a crest 94. The teeth 90 can be formed in any desired manner, such as a plurality of square teeth, but in the particular example provided, a width of each tooth 90 tapers between its root 92 and crest 94 such that the width of each tooth 90 is narrowest at its crest 94. A depth of each tooth 90 can be sized in a desired manner to provide the teeth 90 with a desired profile. For example, each tooth 90 can have a depth that can be greater than or equal to one-half of its width. In the example provided, the teeth 90 have a depth that is equal to one-half of their width. Each securing aperture 86 can be formed through an associated one of the first housing shell 60 or the second housing shell 62 and can be centered between the welds 60. In the example provided, two securing apertures 86 are formed through each tube mount 68 (i.e., securing apertures 86 are formed through both the first and second housing shells 60 and 62). The securing apertures 86 are generally diamond-shaped in the example provided, but it will be appreciated that the securing apertures 86 can be shaped differently. The interior corners 98 formed by the securing apertures 86 can be rounded.

Figure 5:
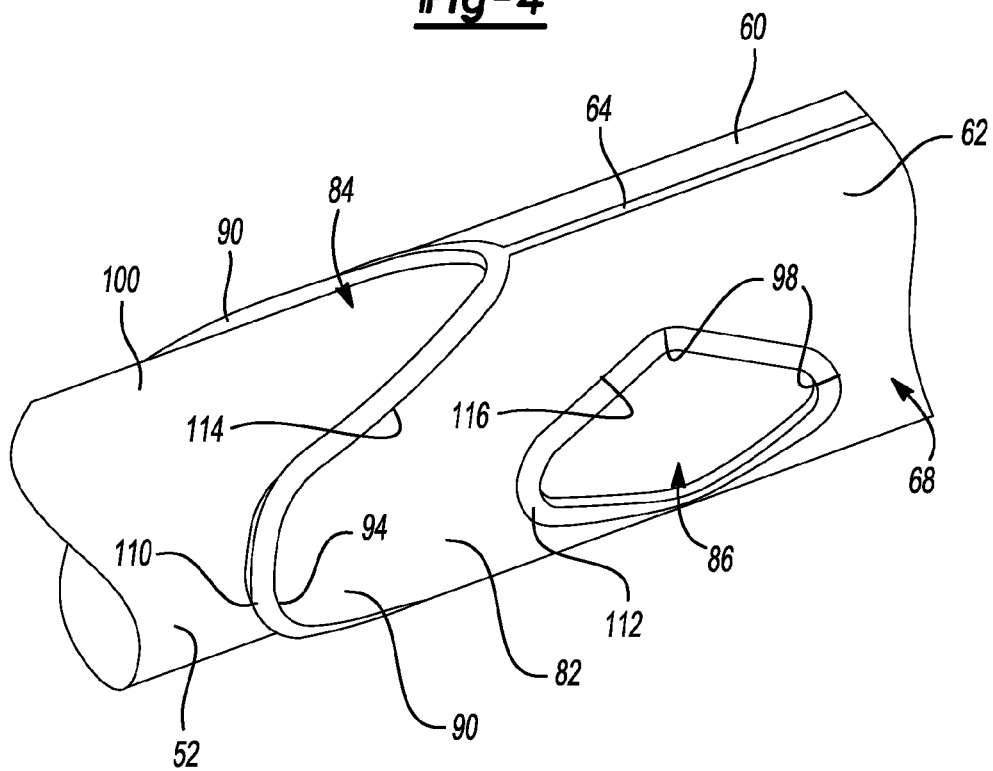
FIG. 5 is an enlarged portion of FIG. 3.

With reference to FIG. 5, the axle tubes 52 are formed of a material that can be welded to the first and second housing shells 60 and 62. In the example provided, the axle tubes 52 are formed of steel. A first end 100 of each axle tube 52 can be received into an associated one of the tube mounts 68 such that the first end 100 extends beyond the securing aperture(s) 86. The first ends 100 of the axle tubes 52 can be received into the tube mounts 68 in any desired manner, such as in a slip-fit or a press-fit manner. If desired, suspension brackets 106 (FIG. 3) can be mounted to the axle tubes 52.

First and second fillet welds 110 and 112, respectively, can be employed to fixedly couple the axle tubes 52 to the tube mounts 68. Each of the first fillet welds 110 can be formed between an associated one of the tube mounts 68 and an associated one of the axle tubes 52 to fixedly couple the axle tube 52 to the tube mount 68. Each first fillet weld 110 can be formed about a perimeter 114 of a distal end 82 of the associated one of the tube mounts 68 such that the first welds 110 occur substantially completely over the entirety of (the edge of) the teeth 90. Each of the second fillet welds 112 can be formed between a corresponding one of the tube mounts 68 and a corresponding one of the axle tubes 52 to fixedly couple the axle tube 52 to the tube mount 68. Each second fillet weld 112 can be formed about the edge of an associated one of the securing apertures 86 such that each of the second fillet welds 112 occurs substantially completely about the inside perimeter 116 of the associated one of the securing apertures 86.

Returning to FIGS. 2 and 3, the housing cover 54 can be fixedly coupled to the rear flange 72 of the carrier portion 66 in any desired manner to close a rear side of the differential cavity 76. For example, the housing cover 54 can be formed of a stamped sheet material (e.g., steel) and can be welded to the rear flange 72. In the particular example provided, the housing cover 54 is integrally formed with the second housing shell 62.

The carrier 56 can have a pair of bearing bulkheads 130 and can be mated to the carrier portion 66 such that the bearing bulkheads 130 are received in the differential cavity 76. The carrier 56 can be removably coupled to the front flange 70 of the carrier portion 66 to close a front side of the differential cavity 76 and to fixedly couple the bearing bulkheads 130 to the wall member 74. The input pinion 42 can be mounted to the carrier 56 for rotation about a first axis 140. The differential assembly 44 can be mounted to the bearing bulkheads 130 for rotation about a second axis 142 that can be transverse to the first axis 140. The input pinion 42 can be configured to drive the differential assembly 44. In the particular example provided, the differential assembly 44 includes a hypoid bevel ring gear 148 that is meshingly engaged to the input pinion 42.

Figure 6:
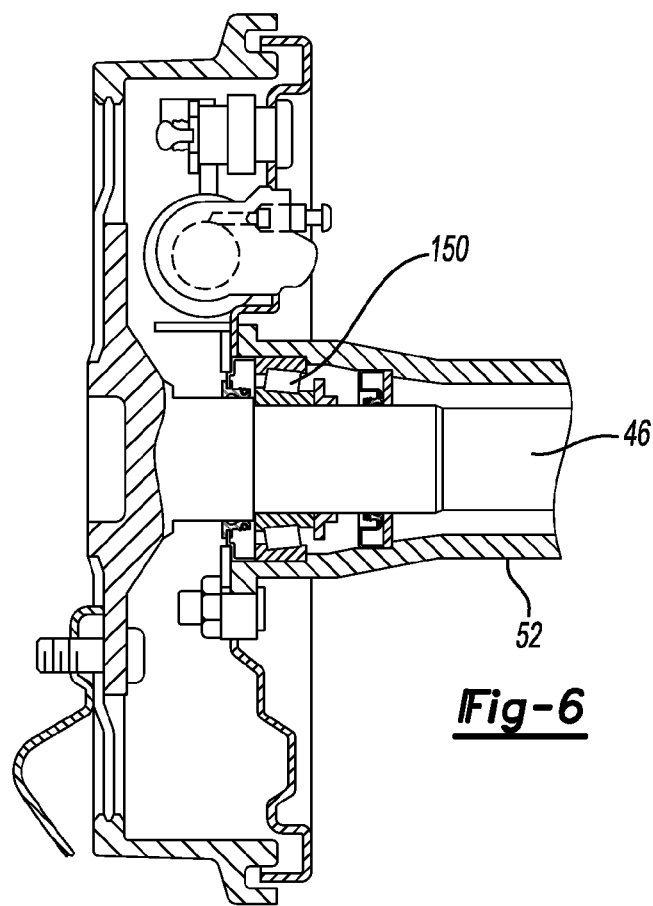
FIG. 6 is a longitudinal section view of an end of the rear axle assembly illustrating the mounting of an axle shaft to an axle housing assembly in a semi-float manner.
Figure 7:
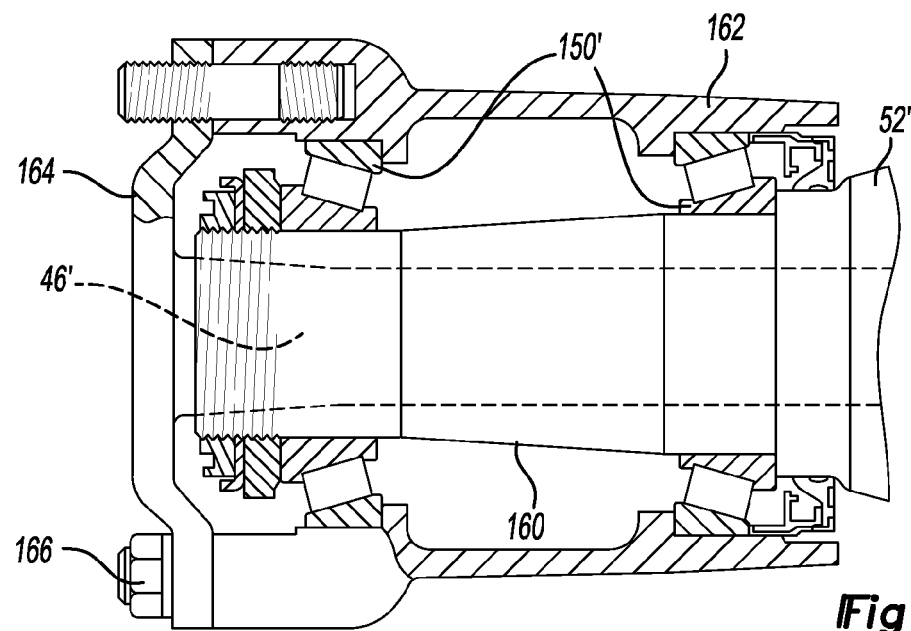
FIG. 7 is a view similar to that of FIG. 6 but illustrating the mounting of an axle shaft to an alternately constructed axle housing assembly in a full-float manner.

Each of the axle shafts 46 can be received through a corresponding one of the axle tubes 52 and the tube mounts 68. Each axle shaft 46 can extend into the differential cavity 76 and can be coupled to a corresponding one of the output members (not specifically shown) of the differential assembly 44 in a conventional and well known manner. With additional reference to FIG. 6, bearings can be employed to support the axle shafts 46 for rotation relative to the axle tubes 52. In the particular example provided, a set of bearings 150 is received between the axle tubes 52 and the axle shafts 46 in a semi-float configuration in which the axle shafts 46 carry weight and apply drive torque to the rear wheels 26 (FIG. 1). Alternatively, the bearings could be arranged in a full-float configuration as shown in FIG. 7 in which each set of the bearings 150' is disposed between a wheel spindle 160 formed on an associated one of the axle tubes 52' and a wheel hub 162; the axle shaft 46' can have an axle flange 164 that can be coupled to the wheel hub 162 with a plurality of threaded fasteners 166.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
   a carrier housing having a carrier portion, a pair of bearing bulkheads, and a pair of tube mounts, the carrier portion having a wall member and defining a differential cavity about the bearing bulkheads, the bearing bulkheads being fixedly coupled to the wall member and adapted to support a differential assembly for rotation within the differential cavity, each of the tube mounts being a hollow structure with a proximal end, which is fixedly coupled to an associated lateral side of the carrier portion, and a distal end that is opposite the proximal end, the tube mounts being in fluid communication with the differential cavity, each of the distal ends of the tube mounts having a plurality of circumferentially spaced apart notches that define a plurality of teeth;
   a pair of axle tubes, each of the axle tubes being received into an associated one of the tube mounts; and
   a pair of first fillet welds coupling the axle tubes to the tube mounts, each of the first fillet welds being formed about a perimeter of an associated one of the distal ends such that each of the first welds occurs substantially completely over the entirety of the teeth;
   wherein a securing aperture is formed through each tube mount, and wherein a second fillet weld couples each of the axle tubes to a corresponding one of the tube mounts, each of the second fillet welds being formed about a perimeter of an associated one of the securing apertures such that each of the second fillet welds occurs substantially completely over the entirety of the associated one of the securing apertures.

2. The axle assembly of claim 1, wherein each tooth having a root and a crest, and wherein a width of each tooth tapers between its root and crest.

3. The axle assembly of claim 2, wherein the width of each tooth is narrowest at its crest.

4. The axle assembly of claim 1, wherein a depth of each tooth is greater than or equal to one-half of the width of the tooth.

5. The axle assembly of claim 1, wherein each of the notches is identically shaped and sized.

6. The axle assembly of claim 1, wherein the axle tubes are formed of steel.

7. The axle assembly of claim 6, wherein the carrier housing is formed of steel.

8. The axle assembly of claim 1, wherein the securing apertures are diamond-shaped.

9. The axle assembly of claim 1, wherein the axle tubes are press-fit to the tube mounts.

10. The axle assembly of claim 1, wherein the carrier housing comprises a first housing shell and a second housing shell that are welded to one another.

11. The axle assembly of claim 1, wherein the bearing bulkheads are removeably coupled to the wall member.

12. The axle assembly of claim 1, wherein each of the axle tubes comprises a wheel spindle portion.

13. An axle assembly comprising:
    a carrier housing having a wall member, a pair of bearing bulkheads, and a pair of tube mounts, the wall member defining a differential cavity about the bearing bulkheads, the bearing bulkheads being fixedly coupled to the wall member and adapted to support a differential assembly for rotation within the differential cavity, each of the tube mounts being a hollow structure with a proximal end, which is fixedly coupled to an associated lateral side of the carrier housing, and a distal end that is opposite the proximal end, wherein a securing aperture is formed through each of the tube mounts;
    a pair of axle tubes, each of the axle tubes being received into an associated one of the tube mounts; and
    a pair of fillet welds, each of the fillet welds coupling a corresponding one of the axle tubes to a corresponding one of the tube mounts, each of the fillet welds being formed about a perimeter of an associated one of the securing apertures such that each of the fillet welds occurs substantially completely over an inside perimeter of the associated one of the securing apertures.

14. The axle assembly of claim 13, wherein each of the securing apertures is diamond-shaped.

15. The axle assembly of claim 13, wherein the axle tubes are press-fit to the tube mounts.

16. The axle assembly of claim 13, wherein the axle tubes are formed of steel.

17. The axle assembly of claim 16, wherein the carrier housing is formed of steel.

18. The axle assembly of claim 13, wherein the carrier housing comprises first and second housing shells that are welded together.

19. An axle assembly comprising:
    a carrier housing having a wall member, a pair of bearing bulkheads, and a pair of tube mounts, the wall member defining a differential cavity about the bearing bulkheads, the bearing bulkheads being fixedly coupled to the wall member and adapted to support a differential assembly for rotation within the differential cavity, each of the tube mounts being a hollow structure with a proximal end, which is fixedly coupled to an associated lateral side of the carrier housing, and a distal end that is opposite the proximal end, the tube mounts being in fluid communication with the differential cavity, each of the distal ends of the tube mounts having a plurality of circumferentially spaced apart notches;
    a pair of axle tubes, each of the axle tubes being formed of steel and being received into an associated one of the tube mounts; and
    a pair of first fillet welds coupling the axle tubes to the tube mounts, each of the first fillet welds being formed about a perimeter an associated one of the distal ends such that each of the first welds occurs substantially completely over the entirety of the circumferentially spaced apart notches;
    wherein the circumferentially spaced apart notches form a plurality of teeth, each tooth having a root and a crest, and wherein a width of each tooth tapers between its root and crest;
    wherein the width of each tooth is narrowest at its crest;
    wherein a depth of each tooth is greater than or equal to one-half of the width of the tooth;
    wherein each of the notches is identically shaped and sized;
    wherein a securing aperture is formed through each tube mount, and wherein a second fillet weld couples each of the axle tubes to a corresponding one of the tube mounts, each of the second fillet welds being formed about a perimeter of an associated one of the securing apertures such that each of the second fillet welds occurs substantially completely over the entirety of the associated one of the securing apertures.

20. The axle assembly of claim 19, wherein the securing apertures are diamond-shaped.

21. The axle assembly of claim 19, wherein the axle tubes are press-fit to the tube mounts.

22. An assembly comprising:
a tube mount having a tubular side wall, a plurality of circumferentially spaced apart notches formed on a first end of the tubular side wall, and a securing aperture formed through the tubular side wall, the notches form a plurality of teeth;
a tube received into the tube mount;
a first fillet weld coupling the tube to the tube mount, the first fillet weld being formed about a perimeter the first end such that each of the first welds is formed substantially completely over the entirety of the teeth; and
a second fillet weld coupling the tube to the tube mount, the second fillet weld being formed about a perimeter of the securing aperture such that the second fillet weld is formed substantially completely over an inside perimeter of the securing aperture.

* * * * *